(12) United States Patent
Shin et al.

(10) Patent No.: US 7,486,474 B2
(45) Date of Patent: Feb. 3, 2009

(54) HARD DISK DRIVE HAVING BREATHER FILTER

(75) Inventors: Seng-chul Shin, Osan-si (KR); Hong-kwon Lee, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 335 days.

(21) Appl. No.: 11/002,113

(22) Filed: Dec. 3, 2004

(65) Prior Publication Data

US 2005/0168868 A1      Aug. 4, 2005

(30) Foreign Application Priority Data

Jan. 30, 2004     (KR) .................. 10-2004-0006117

(51) Int. Cl.
  *G11B 33/14*    (2006.01)
(52) U.S. Cl. .................................. 360/97.02
(58) Field of Classification Search ............... 360/97.02
  See application file for complete search history.

(56) References Cited

U.S. PATENT DOCUMENTS

| | | | | |
|---|---|---|---|---|
| 5,539,595 A | * | 7/1996 | Beck et al. ............... | 360/97.01 |
| 5,590,001 A | * | 12/1996 | Ino et al. .................. | 360/97.02 |
| 5,764,435 A | * | 6/1998 | Sugimoto et al. ......... | 360/97.02 |
| 6,208,484 B1 | * | 3/2001 | Voights .................... | 360/97.02 |
| 6,238,467 B1 | * | 5/2001 | Azarian et al. ................. | 96/135 |
| 6,285,524 B1 | * | 9/2001 | Boigenzahn et al. ..... | 360/97.01 |
| 6,618,222 B1 | * | 9/2003 | Watkins et al. ........... | 360/97.02 |
| 7,082,012 B2 | * | 7/2006 | Macpherson et al. ...... | 360/97.02 |
| 7,166,142 B2 | * | 1/2007 | Tuma et al. ................ | 55/385.6 |

FOREIGN PATENT DOCUMENTS

| | | | |
|---|---|---|---|
| JP | 57003271 | * | 1/1982 |
| JP | 2000-222873 | | 8/2000 |
| JP | 2002117647 | * | 4/2002 |
| KR | 1998-86539 | | 12/1998 |
| KR | 2000-0050563 | | 8/2000 |
| KR | 2002-0042424 | | 6/2002 |

* cited by examiner

*Primary Examiner*—Angel A. Castro
(74) *Attorney, Agent, or Firm*—Staas & Halsey LLP

(57) ABSTRACT

A hard disk drive including: a base; a disk pivotally installed in the base to store data; an actuator installed in the base to move a read/write head to a predetermined position of the disk; a cover assembled with the base and having an air hole for making internal/external pressures of the hard disk drive equal to each other; and a breather filter interposed between the cover and the base in order to filter air introduced through the air hole of the cover. An upper portion of the breather filter is tightly coupled to the cover and a lower portion of the breather filter is tightly coupled to the base.

13 Claims, 4 Drawing Sheets

HARD DISK DRIVE HAVING BREATHER FILTER

CROSS-REFERENCE TO RELATED APPLICATION

This application claims the priority of Korean Patent Application No. 2004-6117, filed on Jan. 30, 2004, in the Korean Intellectual Property Office, the disclosure of which is incorporated herein in its entirety by reference.

BACKGROUND OF THE INVENTION

1. Field of the Invention

The present invention relates to a hard disk drive, and more particularly, to a hard disk drive which can effectively reduce vibration and noise that are generated out of the hard disk drive.

2. Description of the Related Art

Hard disk drives (HDD), one of the information storage devices used in computers are devices for reproducing/recording data from/on to disks using a read/write head. In a conventional hard disk drive, a read/write head lifts up from a recording surface of a rotating disk and an actuator moves the read/write head to a desired position of the disk. In this manner, the conventional hard disk drive performs the reproducing/recording.

FIG. 1 is a sectional view of a hard disk drive according to the related art, which is disclosed in Korean Patent Laid-Open Publication No. 1998-86539.

Referring to FIG. 1, the hard disk drive 10 includes a disk (not shown) to store data and an actuator (not shown) to move a read/write head (not shown) to a predetermined position of the disk. Base 11 and cover 13 are assembled with each other to define an inner space 20. The disk is provided on the base 11 of the inner space 20. In order to make internal/external pressures of the hard disk drive equal to each other, an air hole 15 is provided. The air hole 15 allows communication to take place between the inner space 20 with the outside of the hard disk drive. Breather filter 17 is provided on the air hole 15 and filters particles, such as fine dust, which are contained in air which is introduced from the outside to the inner space 20.

When the hard disk drive 10 operates, noise and vibration occur due to high speed rotation of the disk and the movement of the actuator. For the purpose of preventing transmission of the noise and vibration, damping members 18 and 19 are attached to a top face of the cover 13 and a bottom face of the base 11, respectively. Such a hard disk drive, however, tends to be heavy because the damping members 18 and 19 are required to be massive. In recent years, with the emergence of portable electronic products, such as notebook computers, PDAs or the like, small-sized and lightweight hard disk drives are increasingly demanded. Accordingly, there is a demand for a new method of minimizing an increase of weight and reducing noise and vibration in driving hard disk drives.

SUMMARY OF THE INVENTION

The present invention provides a hard disk drive which prevents noise and vibration, caused by a rotation of a disk, from being emitted to the outside at the disk drive by tightly coupling a breather filter to both a base and a cover.

According to an aspect of the present invention, a hard disk drive, includes: a base; a disk pivotally installed in the base to store data; an actuator installed in the base to move a read/write head to a predetermined position of the disk; a cover assembled with the base and having an air hole for making internal/external pressures of the hard disk drive equal to each other; and a breather filter interposed between the cover and the base in order to filter air introduced through the air hole of the cover; wherein an upper portion of the breather filter is tightly coupled to the cover and a lower portion of the breather filter is tightly coupled to the base.

The upper portion of the breather filter may be adhered to the cover.

The breather filter may include: a filter member; and a housing having an upper opening and a lateral opening, and providing an inner space enclosing the filter member inside. The upper opening and the lateral opening may be formed at positions where air passes through the filter member from/to inside/outside of the cover. Further, the upper opening and the lateral opening may communicate with each other.

The hard disk drive may further include a damping member provided on the housing, and the damping member may be tightly coupled to the cover.

The hard disk drive may further include a damping member provided below the housing, and the damping member may be tightly coupled to the base.

The breather filter may include: a filter member; a housing having an upper opening and a lower opening, and providing an inner space to enclose the filter member inside; and a damping member provided below the housing and tightly coupled to the base, and having a lateral opening; the upper and lower openings of the housing and the lateral opening of the damping member may be formed at positions where air passes through the filter member from/to inside/outside of the cover and communicates each other.

The hard disk drive may further include a damping member provided on the housing, and the damping member may be tightly coupled to the cover.

Additional and/or other aspects and advantages of the invention will be set forth in part in the description which follows and, in part, will be obvious from the description, or may be learned by practice of the invention.

BRIEF DESCRIPTION OF THE DRAWINGS

The above and/or other aspects and advantages of the present invention will become more apparent by describing in detail exemplary embodiments thereof with reference to the attached drawings in which.

DETAILED DESCRIPTION OF THE PREFERRED EMBODIMENTS

Figure 1:
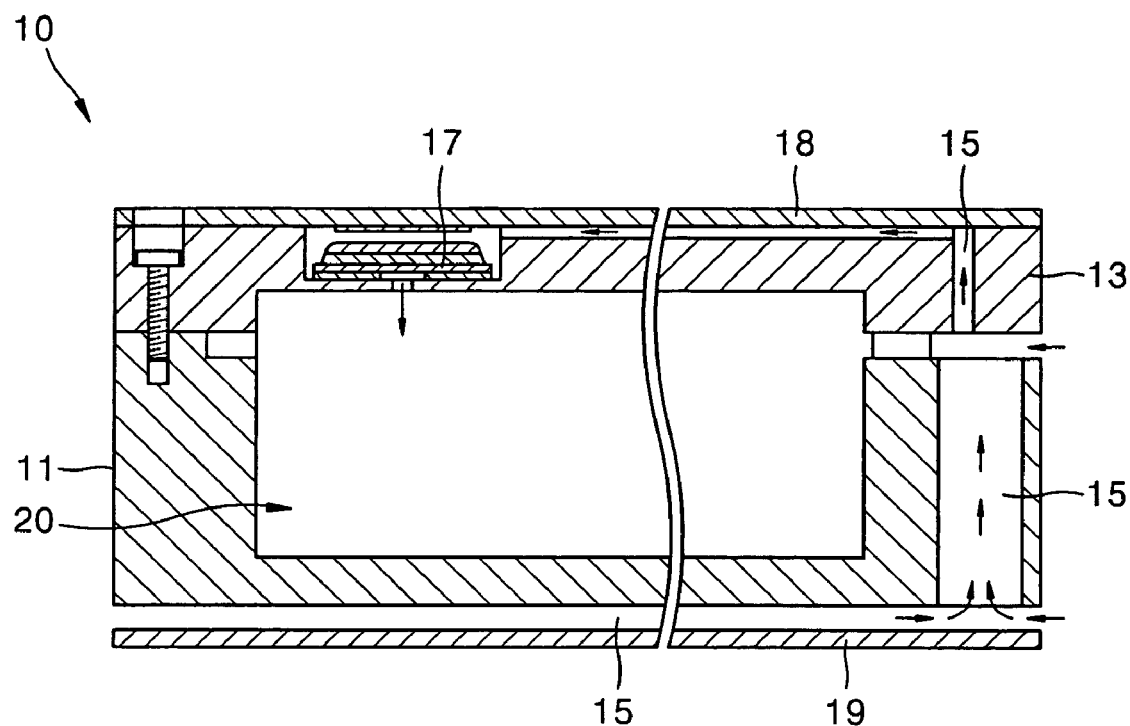
FIG. 1 is a sectional view of a conventional hard disk drive.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
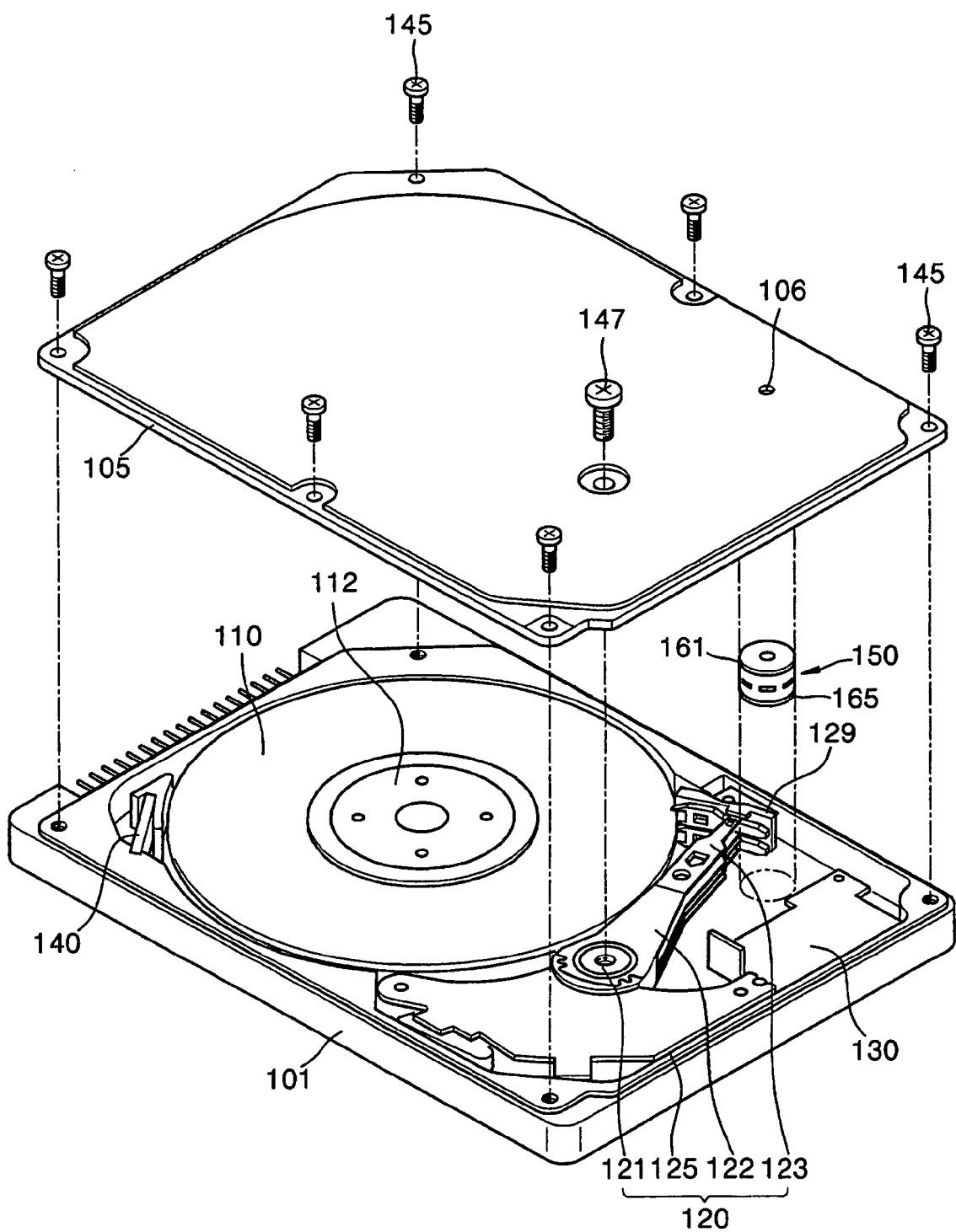
FIG. 2 is an exploded perspective view of a hard disk drive according to a first embodiment of the present invention.
Figure 3:
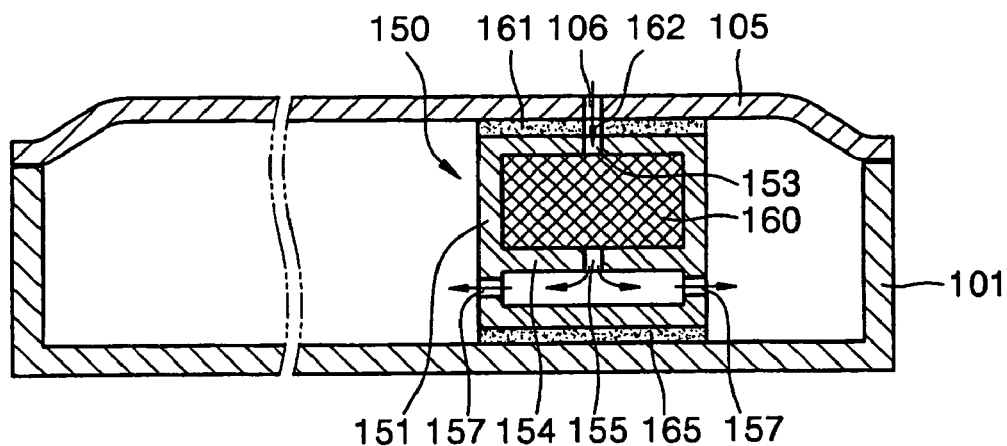
FIG. 3 is a sectional view of the hard disk drive according to the first embodiment of the present invention.

FIGS. 2 and 3 are an exploded perspective view and a sectional view of a hard disk drive according to a first embodiment of the present invention, respectively.

Referring to FIGS. 2 and 3, the hard disk drive according to the first embodiment of the present invention includes a base 101, a disk 110 to store data, a spindle motor 112 to rotate the disk 110, an actuator 120, an FPC bracket 130, a cover 105, and a first breather filter 150.

The base 101 is generally formed of aluminium or aluminium alloy and is manufactured by die casting. A receiving space for the disk 110, the spindle motor 112 and the actuator 120 is provided on an upper portion of the base 101. A second breather filter 140 is provided at one corner of the receiving space to filter fine particles or gases, which are contained in air flowing inside the hard disk drive.

The spindle motor 112 is mounted on the base 101 of the hard disk drive. At least one disk 110 is installed in a hub of the spindle motor 112 and rotates together with the hub.

The actuator 120 which moves a read/write head to a predetermined position of the disk 110 includes a swing arm 122, a suspension 123 and a voice coil motor (VCM) 125. The swing arm 122 is pivotally mounted on a pivot bearing 121, which is installed in the base 101. The pivot bearing 121 is coupled with the cover 105 by a fixing bolt 147 that passes through the cover 105, such that the pivot bearing 121 is fixed inside the hard disk drive. The suspension 123 is coupled to a front portion of the swing arm 122 to elastically bias a slider toward the disk 110. Here, the read/write head is mounted on the slider. The voice coil motor 125 provides a driving force to rotate the swing arm 122. The voice coil motor 125 is controlled by a servo control system and rotates the swing arm 122 in a direction based on Fleming's left hand rule by an interaction between a current inputted to the VCM coil 125 and a magnetic field induced by a magnet (not shown).

According to this structure, if the hard disk drive is powered on and the disk 110 starts to rotate, the voice coil motor 125 rotates the swing arm 122 in a counterclockwise direction, such that the read/write head is moved over a recording surface of the disk 110. Meanwhile, if the hard disk drive is powered off and the disk 110 is stopped, the voice coil motor 125 rotates the swing arm 122 in a clockwise direction, such that the read/write head is escaped from the recording surface of the disk 120. Then, the read/write head is parked on a ramp 129, which is provided outside the disk 110.

The FPC bracket 130 is disposed adjacent the voice coil motor 125 and is installed in a corner of the base 101, which is relatively separate from the disk 110. The FPC bracket 130 couples a flexible printed circuit (not shown) to a printed circuit board (not shown). Here, the flexible printed circuit is connected to the actuator 120 and the printed circuit board is disposed below the base 101.

The cover 105 is assembled with the base 101 by a plurality of coupling bolts 145 and protects the disk 110, the spindle motor 112 and the actuator 120. Also, the cover 105 prevents introduction of dust or moisture into the hard disk drive. The cover is generally manufactured by a pressing of a stainless steel plate. Meanwhile, an air hole 106 is formed in the cover 105 in order to equalize internal and external pressures of the hard disk drive.

The breather filter 150 is interposed between the cover 105 and the base 101. The breather filter 150 filters particles, such as fine dust, which are contained in air introduced into the hard disk drive through the air hole 106. The breather filter 150 includes: a filter member 160 formed of carbon (C) or the like; a cylinder-shaped housing 151 which has an inner space enclosing the filter member 160; and first and second damping members 161 and 165 which are respectively attached to a top and a bottom of the housing 151, respectively. The first and second damping members 161 and 165 are tightly coupled to an inner surface of the cover 105 and the base 101, respectively. Specifically, the first damping member 161 may be adhered to an inner surface of the cover 105 in order to avoid the difficulty of adjusting a position of the breather filter 150 when the cover 105 and the base 101 are assembled with each other and in order to prevent contamination that is caused due to an entry of a foreign substance driving the assembling process.

The housing 151 includes: an upper opening 153 provided along the same axis as the air hole 106 of the cover 105; a lower opening 155 provided in the wall 154 defining the inner space where the filter member 160 is received; and a lateral opening 157 provided in lateral portions below the wall 154. Also, the first damping member 161 has an opening 162 which is provided along the same axis as the air hole 106 of the cover 105. Accordingly, an air passage is formed between the inside and the outside of the hard disk drive. As indicated by arrows of FIG. 3, air passes through the filter member 160 from the outside of the hard disk drive and then flows into the hard disk drive with particles having been filtered.

The damping members 161 and 165 absorb noise and vibration and may be formed of any material that provides this advantage. The damping members 161 and 165 may also be formed of porous material. Where the damping members 161 and 165 are made of porous material, air may flow in the directions of the arrows in FIG. 3 even if the opening 162 of the first damping member 161 is not available.

If the hard disk drive constructed as above is driven, the disk 110 rotates at a high speed and noise and vibration occur in the hard disk drive. Such noise and vibration may be caused because of vibration of the spindle motor 112 itself. Vibration due to eccentricity of the disk 110 and flowing of air due to rotation of the disk 110 are transferred through the base 101 out of the hard disk drive. Also, such noise and vibration may be caused because the above vibrations are transferred from the base 101 to the cover 105 through the coupling bolts 145 or the fixing bolt 147 out of the hard disk drive. Indeed, with reference to the conventional disk drive, there are many unsupported portions in the cover 105 and the base 101, therefore noise and vibration occurring in the conventional disk drive may have a higher intensity.

The hard disk drive of FIGS. 2 and 3 however has one more support point than the conventional hard disk drive, thus reducing noise and vibration. In the hard disk drive according to the present invention, circumferences of the cover 105 and the base 101 are fixedly supported by the coupling bolts 145, the cover 105, and positions adjacent to the pivot bearing 121 of the base 101 are fixedly supported by the fixing bolt 147. In addition, the cover 105 and the base 101 are supported by the breather filter 150, which is attached thereto.

Accordingly, compared with the related art, structural rigidity of the hard disk drive is increased, thus reducing noise and vibration much more. The breather filter 150 is disposed between the FPC bracket 130 and the disk 110 owing to a spatial limit in the inside of the hard disk drive. As the support point is positioned closer to the central portion of the hard disk drive, the structural rigidity of the hard disk drive itself is increased much more. Therefore, in an embodiment of the invention, the breather filter 150 should be installed closer to the hub of the disk 110.

Figure 4:
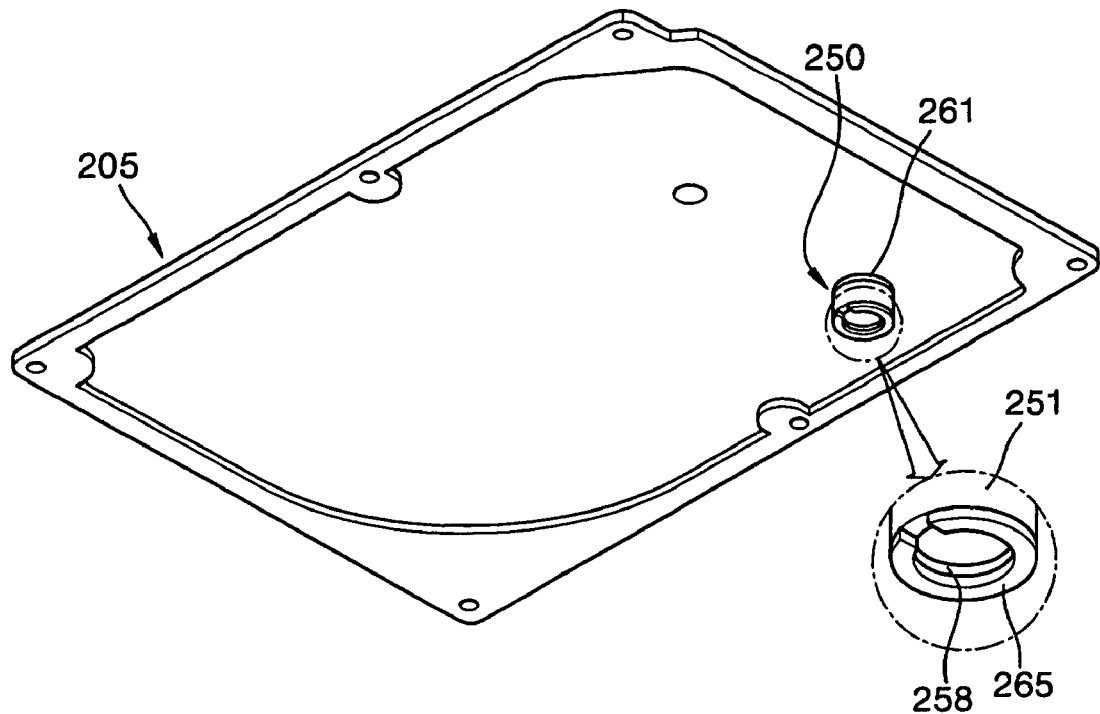
FIG. 4 is a perspective view of a hard disk drive according to a second embodiment of the present invention, in which a breather filter is adhered to a cover.
Figure 5:
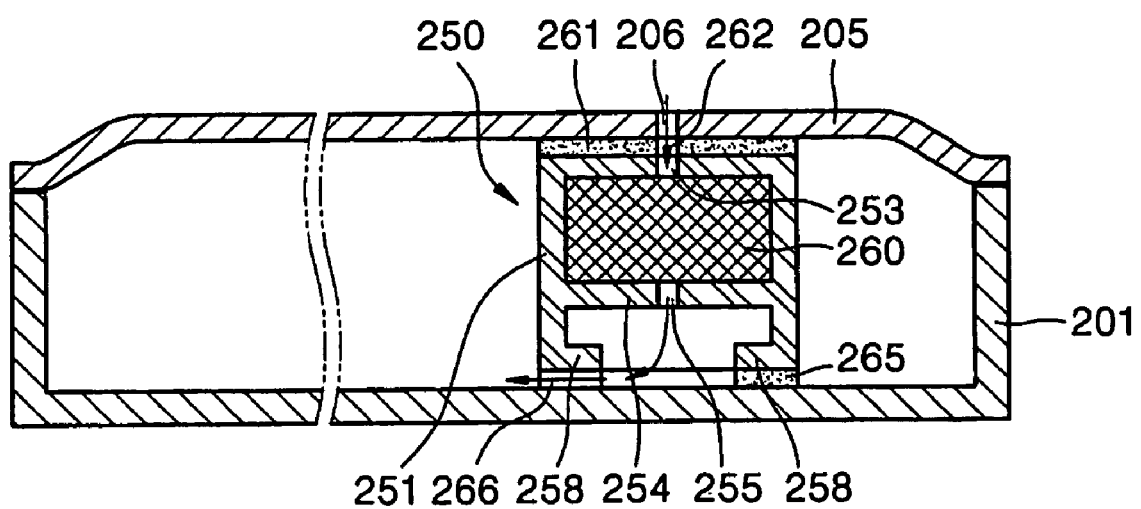
FIG. 5 is a sectional view of the hard disk drive according to the second embodiment of the present invention.

FIG. 4 is a perspective view of a hard disk drive according to a second embodiment of the present invention, in which a breather filter is adhered to a cover, and FIG. 5 is a sectional view of the hard disk drive according to the present invention.

The hard disk drive according to the second embodiment has the same structure as that according to the first embodiment, except where the breather filter 250 is concerned. Therefore, a detailed description thereof will be omitted below. Like the breather filter 150 according to the first embodiment, the breather filter 250 according to second embodiment is interposed between a cover 205 and a base 201. The breather filter 250 includes: a filter member 260 formed of carbon (C) or the like; a cylinder-shaped housing 251 which has an inner space enclosing the filter member 260; and first and second damping members 261 and 265 which are respectively attached to top and bottom of the housing 251. The first and second damping members 261 and 265 are tightly coupled to an inner surface of the cover 205 and the base 201, respectively. The first damping member 261 may be adhered to an inner surface of the cover 205 in order to avoid the difficulty of adjusting position of the breather filter 250 when the cover 205 and the base 201 are assembled with each other and in order to prevent contamination that is caused due to a foreign substance in the assembling process.

The housing 251 includes an upper opening 253 provided along the same axis as the air hole 206 of the cover 205, and a lower opening 255 provided in the wall 254 defining the inner space where the filter member 260 is received. To simplify manufacturing of the housing 251 and to form an air passage, a lower portion of the housing 251 is opened. The second damping member 265 is adhered to a circumference of a lower end portion of the housing 251. To expand the adhesive area, a flange 258 is formed in the lower end portion of the housing 251. One lateral portion of the second damping member 265 is opened, so the shape of the second damping member 265 is similar to the letter "C" with predetermined thickness, corresponding to a shape of a "circular" flange 258.

In the hard disk drive according to the second embodiment of the present invention, the second damping member 265 is adhered to the flange 258 of the housing 251 and is tightly coupled to the base 201. Therefore, the opened lateral portion becomes a lateral opening 266 through which air may pass. As a result, an air passage is formed between the inside and the outside of the hard disk drive. As indicated by arrows of FIG. 5, air passes through the filter member 260 from the outside of the hard disk drive and then flows into the hard disk drive with particles being filtered.

Like the first embodiment, the damping members 261 and 265 absorb noise and vibration and may be formed of any material that provides this advantage. The damping members 261 and 265 may also be formed of porous material. Where the damping members 261 and 265 are formed of porous material, air flows in the directions of the arrows in FIG. 5 even if the opening 262 of the first damping member 261 is not available.

If sound pressure tests are performed on a 2.5-inch hard disk drive according to the related art and a 2.5-inch hard disk drive according to the first or second embodiment of the present invention, the hard disk drive according to the present invention is shown to have a reduced sound pressure than that of the related art. In fact, the difference may be as much as 0.1 bel to 0.15 bel in sound power level.

Additionally, the hard disk drive according to the present invention provides the following effects.

First, when the hard disk drive is driven, vibration and noise may be prevented from being emitted to the outside, because the breather filter are coupled so tightly to the base and the cover that the structural rigidity of the hard disk drive is increased.

Second, the hard disk drive may be reduced in weight, because the damping members are used much less than the related art or not used at all.

Third, the hard disk drive may increase impact resistance, because the structural rigidity of the hard disk drive is increased.

According to the present invention, the damping member may not be provided in the breather filter and the damping member may be provided in only one portion of the breather filter.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A hard disk drive, comprising:
   a base;
   a disk pivotally installed in the base to store data;
   an actuator installed in the base to move a read/write head to a predetermined position of the disk;
   a cover, assembled with the base, having an air hole to equalize internal/external pressures of the hard disk drive; and
   a breather filter, interposed between the cover and the base, to filter air introduced through the air hole of the cover, wherein an upper portion of the breather filter is coupled to the cover and a lower portion of the breather filter is coupled to the base,
   wherein the breather filter includes:
      a filter member, and
      a housing, defining an inner space to enclose the filter member, the inner space having a lateral opening, below the filter member, to communicate the inner space with a space between the base and the cover.

2. The hard disk drive of claim 1, wherein the upper portion of the breather filter is adhered to the cover.

3. The hard disk drive of claim 1, wherein the housing further includes an upper opening.

4. The hard disk drive of claim 3, wherein the upper opening and the lateral opening are formed at positions where air passes through the filter member to and from the inside and the outside of the cover, the upper opening and lateral opening communicate with each other.

5. The hard disk drive of claim 4, further comprising a damping member provided on the housing, wherein the damping member is coupled to the cover.

6. The hard disk drive of claim 4, further comprising a damping member provided below the housing, wherein the damping member is coupled to the base.

7. The hard disk drive of claim 1, wherein the air introduced through the air hole of the cover moves substantially perpendicular to air passing through the lateral opening.

8. A hard disk drive, including a base, the hard disk drive comprising:
   a cover to define an internal space of the hard disk drive between the base and the cover, the cover having an air hole to equalize internal and external pressures of the hard disk drive; and
   a breather filter, having an upper portion coupled to the cover and a lower portion coupled to the base, to filter air introduced to the internal space of the disk drive through the air hole of the cover,
   wherein the breather filter includes:
   a filter member, and
   a housing, defining an inner space to enclose the filter member, the inner space having a lateral opening, below the filter member, to communicate the inner space with a space between the base and the cover.

9. The hard disk drive of claim 8, wherein the upper portion of the breather filter is adhered to the cover.

10. The hard disk drive of claim 8, wherein the housing further includes an upper opening.

11. The hard disk drive of claim 10, wherein the upper opening and the lateral opening are formed at positions where air passes through the filter member to and from the inside and the outside of the cover, and the upper opening and lateral opening communicate with each other.

12. The hard disk drive of claim 11, further comprising a damping member provided on the housing, wherein the damping member is tightly coupled to the cover.

13. The hard disk drive of claim 11, further comprising a damping member provided below the housing, wherein the damping member is tightly coupled to the base.

* * * * *

UNITED STATES PATENT AND TRADEMARK OFFICE
CERTIFICATE OF CORRECTION

PATENT NO.         : 7,486,474 B2
APPLICATION NO. : 11/002113
DATED              : February 3, 2009
INVENTOR(S)        : Sang-Chul Shin et al.

It is certified that error appears in the above-identified patent and that said Letters Patent is hereby corrected as shown below:

Title Page, Column 1; item (75); (Inventors), Line 1, change "Seng-chul" to --Sang-chul--.

Signed and Sealed this

Fifth Day of May, 2009

JOHN DOLL
*Acting Director of the United States Patent and Trademark Office*